United States Patent
Kawasaki et al.

(10) Patent No.: US 9,608,271 B2
(45) Date of Patent: Mar. 28, 2017

(54) POSITIVE ELECTRODE ACTIVE MATERIAL FOR NON-AQUEOUS ELECTROLYTE SECONDARY BATTERY

(71) Applicant: Nichia Corporation, Anan-shi (JP)

(72) Inventors: Tomooki Kawasaki, Naruto (JP); Kenichi Kobayashi, Tokushima (JP)

(73) Assignee: NICHIA CORPORATION, Anan-Shi (JP)

( * ) Notice: Subject to any disclaimer, the term of this patent is extended or adjusted under 35 U.S.C. 154(b) by 199 days.

(21) Appl. No.: 14/667,647

(22) Filed: Mar. 24, 2015

(65) Prior Publication Data
US 2015/0270550 A1    Sep. 24, 2015

(30) Foreign Application Priority Data

Mar. 24, 2014   (JP) .................. 2014-059772
Feb. 9, 2015    (JP) .................. 2015-023113

(51) Int. Cl.
*H01M 4/58*    (2010.01)
*C01G 45/12*   (2006.01)
*C01G 51/00*   (2006.01)

(52) U.S. Cl.
CPC ...... *H01M 4/5825* (2013.01); *C01G 45/1242* (2013.01); *C01G 51/54* (2013.01)

(58) Field of Classification Search
CPC .. C01G 45/1242; C01G 51/54; H01M 4/5825
See application file for complete search history.

(56) References Cited

U.S. PATENT DOCUMENTS

| 2011/0017946 A1* | 1/2011 | Choi ................. C01G 45/1242 252/182.1 |
| 2013/0221269 A1* | 8/2013 | Uehara ............. C01G 45/1242 252/182.1 |
| 2013/0224571 A1 | 8/2013 | Sasaki et al. |

FOREIGN PATENT DOCUMENTS

| JP | 2009-176583 | 8/2009 |
| JP | 2011-238427 | 11/2011 |
| JP | 2013-129589 | 7/2013 |
| WO | WO-2012/060444 | 5/2012 |
| WO | WO-2012/081327 | 6/2012 |

* cited by examiner

*Primary Examiner* — Peter F Godenschwager
*Assistant Examiner* — Andrew J Oyer
(74) *Attorney, Agent, or Firm* — Foley & Lardner LLP

(57) ABSTRACT

The present invention provides a positive electrode active material for nonaqueous electrolyte secondary battery including a lithium transition metal composite oxide represented by the following formula:

$$Li_aNi_xMn_{2-x}Fe_yB_zO_4$$

wherein $1.00 \le a \le 1.30$, $0.30 \le x \le 0.60$, $0.003 \le y \le 0.200$, and $0.003 \le z \le 0.200$.

4 Claims, No Drawings

POSITIVE ELECTRODE ACTIVE MATERIAL FOR NON-AQUEOUS ELECTROLYTE SECONDARY BATTERY

CROSS-REFERENCE TO RELATED APPLICATIONS

This application claims priority to Japanese Patent Application No. 2014-059772 filed on Mar. 24, 2014 and Japanese Patent Application No. 2015-023113, filed on Feb. 9, 2015. The entire disclosure of Japanese Patent Application No. 2014-059772 and No. 2015-023113 are hereby incorporated herein by reference.

BACKGROUND OF THE INVENTION

Field of the Invention

The present invention relates to a positive electrode active material used in nonaqueous electrolyte secondary batteries, such as a lithium ion secondary battery.

Description of the Related Art

In recent years, miniaturization and high functionalization of mobile devices such as mobile phones and note-type PCs have been in progress. For the driving power source of those mobile devices, nonaqueous electrolyte secondary batteries, such as lithium ion secondary batteries have been used. The nonaqueous electrolyte secondary batteries have high working voltage and thus have the advantage of higher energy density than other secondary batteries. Due to this advantage, the nonaqueous electrolyte secondary batteries have started being applied in larger machinery such as electric vehicles.

As a positive electrode active material for nonaqueous electrolyte secondary batteries, $LiCoO_2$ (lithium cobalt oxide) has been put in practical use. The nonaqueous electrolyte secondary batteries which use lithium transition metal composite oxides with a layer structure such as $LiCoO_2$ as the positive electrode active materials have average operating voltage of about 3.5 V. Meanwhile, with the use of a lithium transition metal composite oxide which has a spinel structure such as $LiMn_2O_4$ (lithium manganate) as a positive electrode active material, a nonaqueous electrolyte secondary battery with an average working voltage of 4V or greater can be obtained. Particularly, when $LiNi_{0.5}Mn_{1.5}O_4$ is used, the average operating voltage can be about 4.5 V.

There has been technology in the lithium transition metal composite oxide which has a spinel structure, for substituting a part of manganese with nickel, other elements, or nickel and other elements according to the purpose.

JP 2009-176583A describes a technology, as the object of achieving higher capacity and improving the cycle characteristics in the secondary batteries, for compensating lithium in $LiMn_2O_4$ which has a spinel structure and further for substituting a part of manganese with nickel, boron, iron, or the like.

JP 2013-129589A describes a technology, as the object of improving high rate performance of the secondary batteries, for substituting manganese in $LiMn_2O_4$ which has a spinel structure, with nickel and iron or the like.

SUMMARY OF THE INVENTION

A positive electrode active material for nonaqueous electrolyte secondary battery including a lithium transition metal composite oxide represented by the following formula.

$$Li_aNi_xMn_{2-x}Fe_yB_zO_4$$

In the formula, a, x, y and z satisfy $1.00 \leq a \leq 1.30$, $0.30 \leq x \leq 0.60$, $0.003 \leq y \leq 0.200$, and $0.003 \leq z \leq 0.200$.

Provided is a positive electrode active material employing a lithium-nickel-manganese composite oxide which has a spinel structure in which desorption/insertion of lithium ions can be facilitated and which can improve output characteristics.

DETAILED DESCRIPTION OF THE INVENTION

The power source for large machinery such as electric vehicles is required to satisfy high energy density and high output characteristics at the same time. The lithium transition metal composite oxides having a spinel structure have a high average working voltage, so that secondary batteries with high energy density can be realized. Meanwhile, lithium transition metal composite oxide which has a spinel structure has relatively high energy barrier at the interface with nonaqueous electrolytic solution, which tends to impede desorption/insertion of lithium ions and tends to result in insufficient output characteristics. This tendency has been more significant in a lithium-nickel-manganese composite oxide which has a spinel structure.

Under these circumstances, the present disclosure has been made. An object of the present disclosure is to provide a positive electrode active material for nonaqueous electrolyte secondary battery employing a lithium-nickel-manganese composite oxide which has a spinel structure in which desorption/insertion of lithium ions can be facilitated and which can improve output characteristics.

The present inventors have intensively studied so as to improve the above-mentioned characteristics, and thus the present invention has been completed. The present inventors have found that a lithium-nickel-manganese composite oxide having a spinel structure and containing both iron and boron can reduce an energy barrier in an interface with the nonaqueous electrolytic solution.

A positive electrode active material for nonaqueous electrolyte secondary battery according to embodiments of the present disclosure includes a lithium transition metal composite oxide represented by the following formula.

$$Li_aNi_xMn_{2-x}Fe_yB_zO_4$$

In the formula, a, x, y and z satisfy $1.00 \leq a \leq 1.30$, $0.30 \leq x \leq 0.60$, $0.003 \leq y \leq 0.200$, and $0.003 \leq z \leq 0.200$.

According to the present disclosure, provided is a positive electrode active material employing a lithium-nickel-manganese composite oxide having a spinel structure in which desorption/insertion of lithium ions can be facilitated and which can improve output characteristics. Also, nonaqueous electrolyte secondary batteries which use positive electrode active materials for nonaqueous electrolyte secondary battery according to the embodiments of the present disclosure have a high average working voltage and high output characteristics. Accordingly, the nonaqueous electrolyte secondary batteries which use positive electrode active materials for nonaqueous electrolyte secondary battery according to the embodiments of the present disclosure can exhibit a high average working voltage and high output characteristics.

The positive electrode active material of the present disclosure will be described in more detail below by way of the embodiments and examples. However, the present disclosure is not just limited only to these embodiments and examples.

Positive Electrode Active Material for Nonaqueous Electrolyte Secondary Battery

A positive electrode active material for nonaqueous electrolyte secondary battery has a main component of a lithium-nickel-manganese composite oxide having a spinel structure and containing iron and boron. Hereinafter, the term "positive electrode active material for nonaqueous electrolyte secondary battery" may be simply referred to as "positive electrode active material". Further, the term "lithium-nickel-manganese composite oxide having a spinel structure and containing iron and boron" may be simply referred to as "lithium transition metal composite oxide". That is, the content of the lithium transition metal composite oxide in the positive electrode active material is greater than 50 mass % and preferably 60 mass % or greater, more preferably 80 to 100 mass %. The lithium transition metal composite oxide will be described below.

Lithium Transition Metal Composite Oxide

The lithium transition metal composite oxide is represented by the following formula.

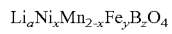

$$Li_aNi_xMn_{2-x}Fe_yB_zO_4$$

In the formula, a, x, y and z respectively satisfy $1.00 \le a \le 1.30$, $0.30 \le x \le 0.60$, $0.003 \le y \le 0.200$, and $0.003 \le z \le 0.200$.

In the formula, the variable "a" satisfies $1.00 \le a \le 1.30$. When the variable "a" is less than 1.00, the output characteristics may not be improved. When the variable "a" exceeds 1.30, synthesis tends to be difficult. The variable "a" preferably satisfies $1.10 \le a \le 1.20$.

In the formula, the variable "x" satisfies $0.30 \le x \le 0.60$. When the variable "x" is less than 0.30, the ratio of nickel with respect to manganese is too low, so that the average working voltage cannot be elevated to a high value of about 4.6 V. When the variable "x" exceeds 0.60, the charge-discharge capacity may be decreased. The variable "x" preferably satisfies $0.30 \le x \le 0.50$.

The variable "y" and the variable "z" respectively satisfy $0.003 \le y \le 0.200$ and $0.003 \le z \le 0.200$. Since nickel, iron, and boron are present in the lithium-nickel-manganese composite oxide at the same time, $Ni_2FeBO_5$ can be formed locally on a surface or the like of the composite oxide. It is thought that the presence of the $Ni_2FeBO_5$ reduces the change in the Gibbs energy associated to desorption (desolvation) of lithium ions from the nonaqueous electrolytic solution and facilitates insertion of lithium ions from the nonaqueous electrolytic solution into the positive electrode active material. The presence of $Ni_2FeBO_5$ can be confirmed by powder x-ray diffraction analysis.

When the variable "y" is less than 0.003 and the variable "z" is also less than 0.003, the amount of $Ni_2FeBO_5$ is too low, which may result in a decrease of the output characteristics. When the variable "y" exceeds 0.200 and the variable "z" also exceeds 0.200, it may result in a decrease in the charge-discharge capacity. The variable "y" and the variable "z" preferably satisfy $0.003 \le y \le 0.100$, $0.003 \le z \le 0.100$. When the variable "y" and the variable "z" respectively satisfy the aforementioned ranges, the amount of $Ni_2FeBO_5$ is increased and the output characteristics is improved.

Further, compared to iron, effect of boron on the charge-discharge capacity is large. Accordingly, it is preferable that the variable "y" and the variable "z" respectively satisfy $0.020 \le y+2z \le 0.100$. When the variable "y" and the variable "z" respectively satisfy the aforementioned range, both a low internal resistance and a high energy density can be achieved.

Optional Component

In the positive electrode active material, unavoidable impurities included during the producing or a minute quantity of additives or the like provided in accordance of the purpose can be present.

Method of Producing Positive Electrode Active Material

For the method of producing a positive electrode active material, a known method of producing a positive electrode active material can be appropriately used. The positive electrode active material can be obtained by using, for example, a method which includes: obtaining a raw material mixture and calcining the raw material mixture. Hereinafter, a step of obtaining a raw material mixture may be referred to as "mixing step". Further, a step of calcining the raw material mixture may be referred to as "calcining step". A method of obtaining the raw material mixture includes a method of obtaining the raw material mixture by mixing raw material compounds which are to be decomposed at high temperature in which the resultant raw material mixture has a target composition to obtain the raw material mixture. Otherwise, a method of obtaining the raw material mixture includes a method of obtaining the raw material mixture by dissolving a raw material compound in a solvent and producing a precipitate by adjusting the temperature and pH, and adding a complexing agent or the like to obtain the raw material mixture. Such aforementioned methods can be used in combination.

Mixing Step

In a mixing step, raw material compounds which are to be decomposed into an oxide at a high temperature are mixed according to an objective composition to obtain a row material mixture, or solvent-soluble raw material compounds are solved in a solvent and a precursor precipitate is produced by means such as adjusting the temperature or pH, or adding a complexing agent, to obtain a raw material mixture. Through the mixing step, a raw material component of the positive electrode active material of the present embodiment can be obtained. The raw material compounds are not specifically limited as long as they can be decomposed to produce oxides at a high temperature. Examples of the raw material compounds include a lithium compound, a nickel compound, a manganese compound, an iron compound, and a boron compound, and an oxide, a carbonate, a hydroxide, a nitrate, or a sulphate of those can also be used.

The mixing ratio of the raw material compounds is not specifically limited, but a mixing ratio which can satisfy the content of each element in the formula is preferable.

Calcining Step

In calcining step, the raw material mixture is calcined to obtain a calcined material. Also, through the calcining step, a heat-treated material which is a positive electrode active material according to the present embodiment can be obtained.

The calcination temperature is not specifically limited, but 600° C. to 1200° C. is preferable. The heat treating can be performed using an appropriate heating means such as an electric furnace, a gas furnace, an infrared heating furnace. The calsination time may differ according to the calcination temperature, but generally, 5 hours or more is sufficient. A longer calcination time is not specifically disadvantageous, but generally, a calcination time of 48 hours will be sufficient. The atmosphere of the calcining is not specifically limited, but an oxidizing atmosphere is preferable. Examples of an oxidizing atmosphere include an air atmosphere and an oxygen-containing atmosphere.

Positive Electrode

A positive electrode for nonaqueous electrolyte secondary battery can be obtained by mixing a positive electrode active material with a known conductive material, an adhesive material, and so forth, to obtain a positive electrode mixture, which is then applied on a known positive electrode collector to form a positive electrode material layer. Examples of conductive material include natural graphite, artificial graphite, and acetylene black. Examples of the adhesive agent include a polyvinylidene fluoride, a polytetrafluoroethylene, and a polyacrylamide. Examples of the positive electrode collector include aluminum, nickel, and a stainless steel.

Nonaqueous Electrolyte Secondary Battery

A nonaqueous electrolyte secondary battery which includes a positive electrode obtained with the use of a positive electrode active material can be obtained by using a positive electrode for nonaqueous electrolyte secondary battery, a known negative electrode for nonaqueous electrolyte secondary battery, a known nonaqueous electrolytic solution, a known separator, and so forth. The negative electrode, the nonaqueous electrolytic solution, the separator, or the like in the nonaqueous electrolyte secondary battery are not specifically limited, and include those for a nonaqueous electrolyte secondary battery described in JP 2002-075367A, JP 2011-146390A, and JP 2006-12433A, the entire contents of those are incorporated herein by reference.

EXAMPLES

Hereinafter, the present invention will be described more specifically. However, the present invention is not just limited only to these illustrative and exemplary. In the description below, in the case where a ratio of elements is shown, it is presented as an amount of substance ratio (molar ratio).

Example 1

A composite oxide of Ni:Mn=22.5:77.5 was obtained by using a coprecipitation method. The composite oxide, lithium carbonate, iron oxide (III), and boric acid were mixed so that Li:(Ni+Mn):Fe:B becomes 1.1:1:0.050:0.005 to obtain a mixed raw material. The obtained mixed raw material was calcined under an air atmosphere at 900° C. for 11 hours to obtain a calcined material. The obtained calcined material was ground and then dry-sieved to obtain a lithium transition metal composite oxide represented by the formula: $Li_{1.10}Ni_{0.450}Mn_{1.550}Fe_{0.050}B_{0.005}O_4$.

Example 2

A lithium transition metal composite oxide represented by the formula $Li_{1.10}Ni_{0.450}Mn_{1.550}Fe_{0.050}B_{0.017}O_4$ was obtained in a similar manner as in Example 1, except that the ratio of elements in the raw material mixture was Li:(Ni+Mn):Fe:B=1.1:1:0.050:0.017.

Example 3

A lithium transition metal composite oxide represented by the formula $Li_{1.10}Ni_{0.450}Mn_{1.550}Fe_{0.050}B_{0.050}O_4$ was obtained in a similar manner as in Example 1, except that the ratio of elements in the raw material mixture was Li:(Ni+Mn):Fe:B=1.1:1:0.050:0.050.

Example 4

A lithium transition metal composite oxide represented by the formula $Li_{1.10}Ni_{0.450}Mn_{1.550}Fe_{0.050}B_{0.005}O_4$ was obtained in a similar manner as in Example 1, except that the ratio of elements in the raw material mixture was Li:(Ni+Mn):Fe:B=1.1:1:0.050:0.05.

Example 5

A lithium transition metal composite oxide represented by the formula $Li_{1.10}Ni_{0.450}Mn_{1.550}Fe_{0.100}B_{0.005}O_4$ was obtained in a similar manner as in Example 1, except that the ratio of elements in the raw material mixture was Li:(Ni+Mn):Fe:B=1.1:1:0.100:0.005.

Example 6

A composite oxide of Ni:Mn=17.5:82.5 was obtained by using a coprecipitation method. The composite oxide, lithium carbonate, iron oxide (III), and boric acid were mixed so that Li:(Ni+Mn):Fe:B becomes 1.1:1:0.050:0.005 to obtain a mixed raw material. The obtained mixed raw material was calcined under an air atmosphere at 900° C. for 11 hours to obtain a calcined material. The obtained calcined material was ground and then dry-sieved to obtain a lithium transition metal composite oxide represented by the formula: $Li_{1.10}Ni_{0.350}Mn_{1.650}Fe_{0.050}B_{0.005}O_4$.

Example 7

A composite oxide of Ni:Mn=27.5:72.5 was obtained by using a coprecipitation method. The composite oxide, lithium carbonate, iron oxide (III), and boric acid were mixed so that Li:(Ni+Mn):Fe:B becomes 1.1:1:0.050:0.005 to obtain a mixed raw material. The obtained mixed raw material was calcined under an air atmosphere at 900° C. for 11 hours to obtain a calcined material. The obtained calcined material was ground and then dry-sieved to obtain a lithium transition metal composite oxide represented by the composition formula: $Li_{1.10}Ni_{0.550}Mn_{1.450}Fe_{0.050}B_{0.005}O_4$.

Comparative Example 1

A lithium transition metal composite oxide represented by the formula $Li_{1.10}Ni_{0.450}Mn_{1.550}Fe_{0.050}O_4$ was obtained in a similar manner as in Example 1, except that the raw material mixture was obtained without using boric acid.

Comparative Example 2

A lithium transition metal composite oxide represented by the formula $Li_{1.10}Ni_{0.450}Mn_{1.550}B_{0.005}O_4$ was obtained in a similar manner as in Example 1, except that the raw material mixture was obtained without using iron oxide (III).

Comparative Example 3

A lithium transition metal composite oxide represented by the formula $Li_{1.10}Ni_{0.450}Mn_{1.550}O_4$ was obtained in a similar manner as in Example 1, except that the raw material mixture was obtained without using iron oxide (III) and boric acid.

Output Characteristics Evaluation

The internal resistance of the nonaqueous electrolyte secondary batteries which respectively employ the lithium transition metal composite oxides obtained in Examples 1 to 7 and Comparative Examples 1 to 3 as a positive electrode active material.

1. Forming Positive Electrode

A positive electrode paste was obtained by kneading a 90 mass % of positive electrode active material, 5 mass % of carbon powder, and a 5 mass % of N-methyl pyrrolidone (NMP) solution of polyvinylidene fluoride (PVDF) (5% as PVDF). The obtained positive electrode paste was applied on a current collector made of an aluminum foil, then dried and rolled to obtain a positive electrode.

2. Forming Negative Electrode

Lithium titanate was used as a negative electrode active material. A negative electrode paste was obtained by dispersing a 97.5 mass % of negative electrode active material, 1.5 mass % of carboxymethyl cellulose (CMC), and a 1.0 mass % of styrene-butadiene rubber (SBR) in pure water and kneading. The obtained negative electrode paste was applied on a current collector made of a copper foil, then dried and rolled to obtain a negative electrode.

3. Forming Nonaqueous Electrolytic Solution

A mixed solvent was prepared by mixing an ethylene carbonate (EC) and a methylethyl carbonate (MEC) at a volume ratio of 3:7 (EC:MEC=3:7). Lithium hexafluorophosphate ($LiPF_6$) is dissolved in the obtained mixed solvent so that the concentration of that becomes 1 mol/L to obtain a nonaqueous electrolytic solution.

4. Separator

A porous polyethylene film is used as a separator.

5. Production of Secondary Battery

A lead electrode is attached to each current collector of the positive and negative electrodes, followed by vacuum drying at 120° C. After drying, a separator was arranged between the positive electrode and the negative electrode and the entire was placed in a bag-shape laminate pack. After that, moisture adsorbed to each member is removed by vacuum drying at 60° C. After vacuum drying, the aforementioned nonaqueous electrolytic solution is injected into the laminate pack, followed by sealing to obtain a nonaqueous electrolyte secondary battery for evaluation. The obtained secondary battery is aged with a micro current thereby allowing the electrolyte to permeate sufficiently into the positive and negative electrodes. After aging, the secondary battery was placed under an environment at −25° C. and the internal resistance was measured.

6. Internal Resistance Measurement

A constant current charging at a full charge voltage of 3.5 V was conducted to 50% of charging depth. After charging, a pulse discharge was conducted at a specific current i and the voltage V was measured. The pulse was supplied at a duration of 10 seconds and an interpulse interval of 10 minutes. The last voltage value of each pulse was read as the voltage V. An approximation straight line was found by plotting the values of the voltage V, and the internal resistance R was found from an absolute value of the inclination of the line.

Energy Density Evaluation The energy density of the secondary batteries which respectively employ positive electrode active materials of the lithium transition metal composite oxides obtained in Examples 1 to 7 and Comparative Examples 1 to 3 was evaluated as described below.

1. Forming Positive Electrode

Positive electrodes were obtained by similar manner as in the secondary batteries fabricated for the output characteristics evaluation.

2. Forming Negative Electrode

A negative electrode was obtained by forming metallic lithium into a sheet-like shape.

3. Forming Nonaqueous Electrolytic Solution

An electrolytic solution was obtained by using a similar manner as that in the secondary batteries fabricated for the output characteristics evaluation, except for using diethyl carbonate in place of MEC.

4. Separator

A separator similar to that used in the secondary battery for output characteristics evaluation was used.

5. Production of Secondary Battery

A lead electrode is attached to the positive electrode and the positive electrode, the separator, and the negative electrode were in this order placed in a housing. The negative electrode is electrically connected to the bottom of the housing made of a stainless steel, so that the bottom portion of the housing serves as the negative terminal. The separator is fixed by a side portion of the housing made of a Teflon®. An end portion of the lead electrode at the positive electrode was led out of the housing to serve as a positive terminal. The positive and negative terminals are respectively electrically insulated by the side portions of the housing. After the placement, the electrolytic solution was injected and the housing was sealed with a container lid member to obtain a sealed battery for evaluation. The obtained battery was used in the evaluation of energy density.

6. Discharge Capacity Measurement

Constant current-constant voltage charging was carried out at a full charge voltage of 5.0 V and a charging rate of 0.1 C. Here, 1C means a current density required to complete discharge within 1 hour from a fully charged state. Then, constant current discharging at a discharging voltage of 3.0 V and a discharging rate of 0.1 C was carried out. The amount of charge per unit mass released from the start of discharge to completion of discharge was determined as discharge capacity $Q_d$.

7. Average Working Voltage Calculation

Time average of working voltage of secondary battery during discharging was calculated and represented as an average working voltage <E>.

8. Energy Density Calculation

Energy per unit mass $\rho_E$ extracted from the secondary battery was calculated from the product of $Q_d$ and <E> and $\rho_E$ was represented as the energy density of the secondary battery.

With regard to Examples 1 to 7 and Comparative Examples 1 to 3, compositions of main component of the respective positive electrode active materials and characteristics of the respective batteries are shown in Table 1.

TABLE 1

|  | Composition of Main Component | R/Ω | $Q_d$/mAhg$^{-1}$ | <E>/V | $\rho_E$/mWhg$^{-1}$ |
|---|---|---|---|---|---|
| Example 1 | $Li_{1.10}Ni_{0.450}Mn_{1.550}Fe_{0.050}B_{0.005}O_4$ | 7.7 | 136.4 | 4.6 | 632 |
| Example 2 | $Li_{1.10}Ni_{0.450}Mn_{1.550}Fe_{0.050}B_{0.017}O_4$ | 7.1 | 132.8 | 4.6 | 613 |
| Example 3 | $Li_{1.10}Ni_{0.450}Mn_{1.550}Fe_{0.050}B_{0.060}O_4$ | 6.9 | 125.6 | 4.6 | 578 |

TABLE 1-continued

| | Composition of Main Component | R/Ω | $Q_d$/mAhg$^{-1}$ | <E>/V | $\rho_E$/mWhg$^{-1}$ |
|---|---|---|---|---|---|
| Example 4 | $Li_{1.10}Ni_{0.450}Mn_{1.550}Fe_{0.005}B_{0.005}O_4$ | 8.7 | 137.3 | 4.6 | 635 |
| Example 5 | $Li_{1.10}Ni_{0.450}Mn_{1.550}Fe_{0.100}B_{0.005}O_4$ | 7.9 | 129.6 | 4.6 | 598 |
| Example 6 | $Li_{1.10}Ni_{0.350}Mn_{1.650}Fe_{0.050}B_{0.005}O_4$ | 7.7 | 138.4 | 4.6 | 633 |
| Example 7 | $Li_{1.10}Ni_{0.550}Mn_{1.450}Fe_{0.050}B_{0.005}O_4$ | 9.0 | 120.1 | 4.6 | 556 |
| Comparative Example 1 | $Li_{1.10}Ni_{0.450}Mn_{1.550}Fe_{0.050}O_4$ | 16.6 | 136.5 | 4.6 | 631 |
| Comparative Example 2 | $Li_{1.10}Ni_{0.450}Mn_{1.550}B_{0.005}O_4$ | 12.1 | 136.5 | 4.7 | 637 |
| Comparative Example 3 | $Li_{1.10}Ni_{0.450}Mn_{1.550}O_4$ | 18.5 | 137.9 | 4.7 | 643 |

From Table 1, the nonaqueous electrolyte secondary batteries which respectively employ the lithium transition metal composite oxides obtained in Comparative Examples 1 or 2 which contains iron or boron as a positive electrode active material did not achieve sufficient reduction in the internal resistance compared to that in Comparative Example 3. Meanwhile, the nonaqueous electrolyte secondary batteries which respectively employ the lithium transition metal composite oxide obtained in Examples 1 to 7 which contains iron and boron as a positive electrode active material achieved a sufficiently low internal resistance of less than 10Ω and sufficiently high energy density of 550 mW/g or greater.

When comparing the internal resistance of the nonaqueous electrolyte secondary batteries which respectively employ the lithium transition metal composite oxides obtained in Examples 1, 6 and 7 as a positive electrode active material, it was found that a very high energy density of 600 mWh/g or greater was obtained when the variable "x" satisfies x≤0.50.

When comparing the internal resistance of the nonaqueous electrolyte secondary batteries which respectively employ the lithium transition metal composite oxides obtained in Examples 1 to 5 as a positive electrode active material, it was founded that a very low internal resistance of less than 8Ω and a very high energy density of 600 mWh/g or greater was obtained when the variables "y" and "z" satisfy 0.020≤y+2z≤0.100.

Positive electrode active material for nonaqueous electrolyte secondary battery according to the present disclosure can be preferably used as the positive electrode active materials for the batteries which are the power sources of large machineries such as electric vehicles.

All publications, patent applications, and technical standards mentioned in this specification are herein incorporated by reference to the same extent as if each individual publication, patent application, or technical standard was specifically and individually indicated to be incorporated by reference.

As described above, it should be obvious that various other embodiments are possible without departing the spirit and scope of the present invention. Accordingly, the scope and spirit of the present invention should be limited only by the following claims.

What is claimed is:

1. A positive electrode active material for nonaqueous electrolyte secondary battery comprising a lithium transition metal composite oxide represented by the following formula:

$$Li_aNi_xMn_{2-x}Fe_yB_zO_4$$

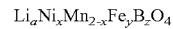

wherein 1.00≤a≤1.30, 0.30≤x≤0.60, 0.003≤y≤0.200, and 0.003≤z≤0.200.

2. The positive electrode active material according to claim 1, wherein 0.30≤x≤0.50.

3. The positive electrode active material according to claim 1, wherein 0.020≤y+2z≤0.100.

4. The positive electrode active material according to claim 2, wherein 0.020≤y+2z≤0.100.

* * * * *